US006750635B2

(12) United States Patent
Harmon

(10) Patent No.: US 6,750,635 B2
(45) Date of Patent: Jun. 15, 2004

(54) APPARATUS AND METHOD FOR COMPARING OUTPUT SIGNALS INDICATIVE OF ENGINE ROTATIONAL SPEED AND/OR GENERATOR ROTATIONAL SPEED

(75) Inventor: Jack Douglas Harmon, Carmel, IN (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 09/961,660

(22) Filed: Sep. 24, 2001

(65) Prior Publication Data

US 2003/0057925 A1 Mar. 27, 2003

(51) Int. Cl.$^{7}$ .................. H02P 9/44; H02P 9/00; H02P 9/10; H02P 11/00

(52) U.S. Cl. .................. 322/29; 322/25; 322/24; 322/23; 322/22; 322/17

(58) Field of Search .................. 322/29, 22–25, 322/17

(56) References Cited

U.S. PATENT DOCUMENTS 1,392,096 A 9/1921 Wagner et al. ................ 52/642
2,976,473 A 3/1961 Shaw et al. ................ 322/28
3,538,362 A 11/1970 Cheetham et al. ................ 310/68
4,275,344 A 6/1981 Mori et al. ................ 322/28
4,636,705 A * 1/1987 Bowman ................ 322/90
4,636,706 A 1/1987 Bowman et al. ................ 322/28
5,254,936 A * 10/1993 Leaf et al. ................ 322/29
5,617,011 A * 4/1997 Hammer et al. ................ 322/28
5,663,631 A * 9/1997 Kajiura et al. ................ 322/28
6,014,016 A * 1/2000 Maruyama et al. ................ 322/28
6,215,285 B1 4/2001 Harmon ................ 322/29
6,291,989 B1 9/2001 Schroeder ................ 324/207.21
6,522,106 B2 * 2/2003 Matsumoto et al. ................ 322/28
6,528,973 B2 * 3/2003 Fury ................ 322/28
6,621,251 B2 * 9/2003 Ogino et al. ................ 322/28
6,624,617 B2 * 9/2003 Holzer et al. ................ 322/29

* cited by examiner

*Primary Examiner*—Nicholas Ponomarenko
*Assistant Examiner*—Pedro J. Cuevas
(74) *Attorney, Agent, or Firm*—Jimmy L. Funke

(57) ABSTRACT

An apparatus and method are provided to deliver a pair of output signals indicative of engine rotational speed and/or generator rotational speed. The signals are compared to each in order to determine if a generator is operating properly. At least one output signal is delivered to, or developed internally and used by, a voltage regulator of the generator. One output signal is generated based on a ripple on a positive voltage input to the voltage regulator from a generator. The other signal is indicative of the voltage at the rectifier bridge.

28 Claims, 2 Drawing Sheets

VOLTAGE REGULATION UNIT
P1
P2
SIS
SPEED SIGNAL APPARATUS
AMP+ LOW PASS FILTER
PHASE LOCKED LOOP
FREQUENCY DIVIDER
ENGINE
IDLE SPEED CONTROL
D
G
S

AMPLIFIER & FILTER
PLL (4046)
DIVIDE BY 6 COUNTER (4018)
+5V
+V
53
54
56
50
52
C0
C1
C2
C3
C4
C5
C6
R1
R2
R3
R4
R5
R6
R7
A1

V
$V_{24}$
$V_{32}$
PT
SIS
t

49
V+
V-
OUTPUT
P1
P2

APPARATUS AND METHOD FOR COMPARING OUTPUT SIGNALS INDICATIVE OF ENGINE ROTATIONAL SPEED AND/OR GENERATOR ROTATIONAL SPEED

TECHNICAL FIELD

The present application relates to an apparatus and method for comparing output signals indicative of engine rotational speed and/or generator rotational speed. The present invention also relates to a voltage regulator adapted to determine engine rotational speed and/or generator rotational speed based on a ripple on a positive voltage input to the voltage regulator from a generator, and a charging system containing such a voltage regulator.

BACKGROUND

Voltage regulating systems for controlling the field current of a diode-rectified alternating current generator, that supplies the electrical loads on a motor vehicle, are known to those skilled in the art. One type of voltage regulator senses the voltage applied to the battery, and if this voltage is higher than a desired regulated value, a transistor that controls field current is switched off. When generator voltage drops below the regulated value, the field controlling transistor is switched on. The transistor is repetitively switched on and off in response to sensed voltage changes to thereby cause the output voltage of the generator to be maintained at a predetermined, desired regulated value.

In another type of voltage regulator the field current is pulse-width modulated at a constant frequency to maintain the output voltage of the generator at a desired regulated value. The pulse width, in this type of system, is a function of the difference between actual generator output voltage and a desired voltage. Examples of this type of regulator are disclosed in U.S. Pat. No. 2,976,473 to Shaw et al. and U.S. Pat. No. 4,275,344 to Mori et al. British Pat. No. 1,392,096 also discloses pulse-width control of field current, and in that patent, the voltage reference takes the form of a cyclic staircase waveform.

Another voltage regulator that employs pulse width modulation of generator field current is disclosed in U.S. Pat. No. 4,636,706 to Bowman et al., the contents of which are incorporated herein by reference. According to Bowman et al., the regulator disclosed in that patent utilizes a digital apparatus that includes an up-down counter which responds to the relative magnitudes of the actual output voltage of the generator and the desired regulated output voltage of the generator. When the actual output voltage of the generator is below the desired regulated value, the counter is incremented or counted up, and when the actual output voltage is above the desired regulated value, the counter is decremented or counted down. The instantaneous count in the counter is used to determine the on time of a semiconductor switch that is connected in series with the field winding of the generator. The instantaneous count thus determines the pulse-width of the voltage that is applied to the field. Whenever actual output voltage exceeds the desired regulated value, the field controlling semiconductor switch is biased off. Thus, during the time that the actual output voltage is above the desired regulated value, the field is not energized and the counter is decremented. When actual output voltage then drops below the desired regulated value, the field is energized at the pulse-width represented by the magnitude of the count in the counter, and the counter is incremented.

A particularly advantageous feature of the Bowman et al. voltage regulator is its ability to adjust the counting rate of the counter based on engine speed. By suitably adjusting the counting rate, the voltage regulator is able to minimize the increased torque load that is applied to the engine by the generator when a large electrical load is applied to the generator at the time that the engine and generator are operating at a low speed such as engine idle speed. Thus, during engine idle, field current is gradually increased so as not to impose a sudden torque load on the engine when a large electrical load is applied to the generator. Since this type of voltage regulator is responsive to engine rotational speed and/or generator rotational speed, it requires an input signal indicative of that speed.

According to the Bowman et al. patent, this input signal is provided by tapping one of the stator winding phases. This phase of the stator winding is tapped by electrically connecting the appropriate input terminal of the voltage regulator to an AC node of the bridge rectifier that is connected to that phase. FIG. 1 shows a line 7 from node 32 to the voltage regulator as an example of such an electrical connection.

SUMMARY

An apparatus and/or method for providing an output signal indicative of engine rotational speed and/or generator rotational speed, and/or by also providing a voltage regulator adapted to determine engine rotational speed and/or generator rotational speed based on a ripple on a positive voltage input to the voltage regulator from a generator, and/or by providing a charging system containing such a voltage regulator. The apparatus compares the compares the signal based upon ripple on a positive voltage input to an input signal that is provided by tapping one of the stator winding phases. If the there is a difference in the two signals an indicator light will be activated and, if necessary, the system is shut down.

An apparatus and method are provided to deliver a pair of output signals indicative of engine rotational speed and/or generator rotational speed. The signals are compared to each in order to determine if a generator is operating properly. At least one output signal is delivered to, or developed internally and used by, a voltage regulator of the generator. One output signal is generated based on a ripple on a positive voltage input to the voltage regulator from a generator. The other signal is indicative of the voltage at the rectifier bridge.

Still other objects, advantages, and features of the present invention will become more readily apparent when reference is made to the accompanying drawings and the associated description contained herein.

DESCRIPTION OF THE PREFERRED EMBODIMENT

Figure 1:
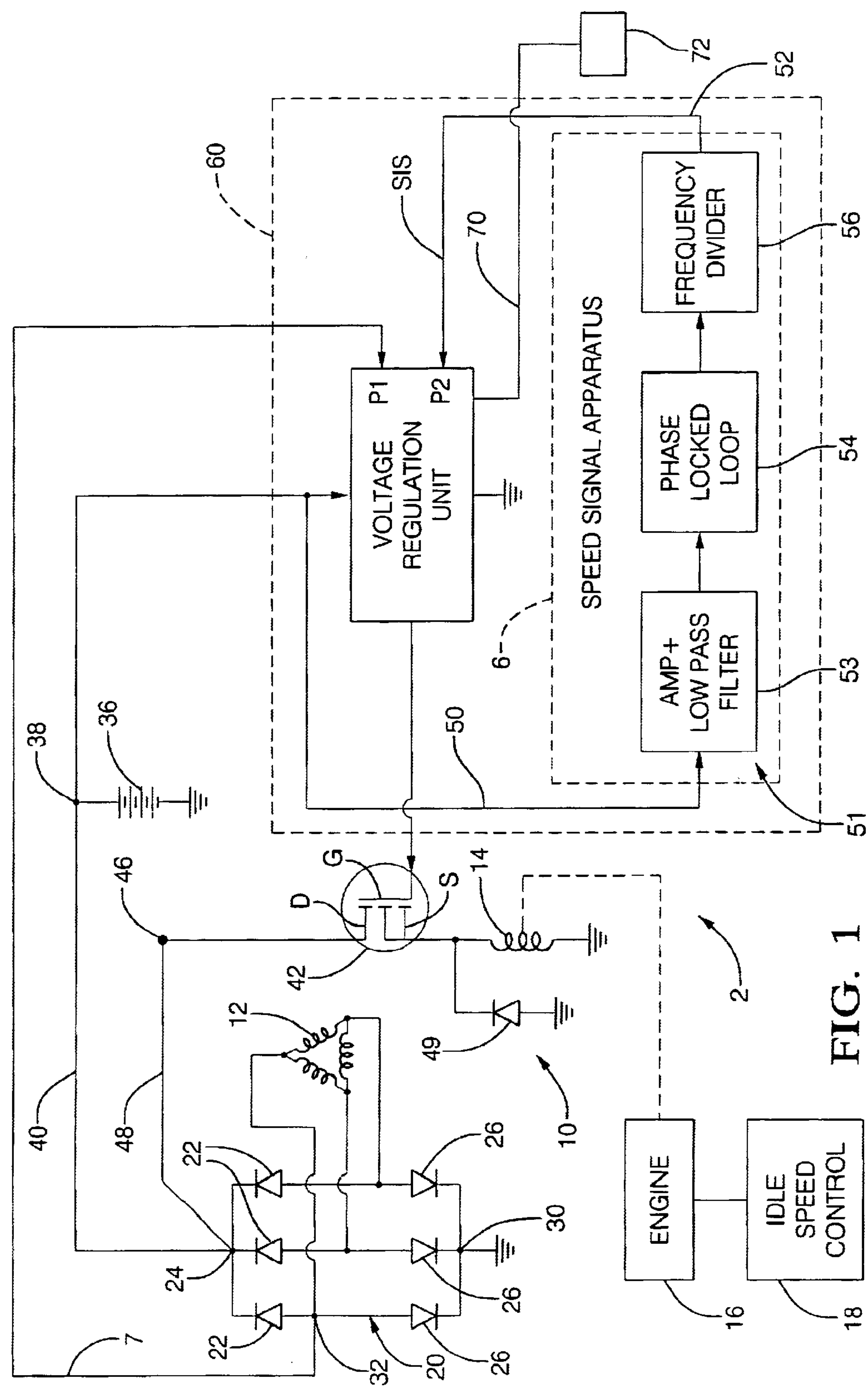
FIG. 1 is a block diagram of a charging system that includes an apparatus for generating a speed-indicative signals according to a preferred embodiment of the present invention.

FIG. 1 illustrates a motor vehicle electrical charging system 2 according to a preferred embodiment of the present invention. The charging system 2 includes a voltage regulation unit 4 and a speed signal apparatus 6 which, as will be described hereinafter, is adapted to provide the voltage regulation unit 4 with a signal indicative of the rotational speed of a generator 10 and/or engine 16 associated with the charging system 2.

An exemplary speed signal apparatus 6 is disclosed in commonly owned and assigned U.S. Pat. No. 6,215,285 the contents of which are incorporated herein by reference thereto.

Preferably, the generator 10 of the charging system 2 is provided in the form of an alternating current generator 10. This alternating current generator 10 has a three phase Delta-connected stator winding 12 and a rotatable field winding 14. The generator 10 is capable of generating multi-phase AC output currents via the stator winding 12 when the stator winding 12 is excited by the rotatable field winding 14.

The generator 10 may be of the type disclosed in the U.S. Pat. No. 3,538,362 to Cheetham et al. with the exception that the generator in FIG. 1 has a Delta-connected stator winding rather than the Y-connected stator winding shown the Cheetham et al. patent. It will be understood, however, that the voltage regulation unit 4 and speed signal apparatus 6 of this invention can be used with generators that have either Delta or Y-connected stator windings.

The field winding 14 is part of a rotor assembly which is rotatably driven by the engine 16 of a motor vehicle. The engine 16 is shown connected to an idle speed control 18 which controls the idle speed of the engine 16. The generator 10 typically is driven at a higher speed than the speed of the engine 16 by a belt and pulleys in a known manner.

The output terminals of the three phase stator winding 12 are connected respectively to AC input terminals of a three-phase full-wave bridge rectifier generally designated by reference numeral 20. The bridge rectifier 20 includes three positive semiconductor diodes 22 which have their cathodes connected to a direct voltage output terminal 24. The bridge rectifier 20 also has three negative semiconductor diodes 26, the anodes of which are connected to a grounded direct current output terminal 30 of the bridge rectifier 20.

The junction 32 that is connected between a pair of positive and negative diodes is connected to the voltage regulation unit 4 at P1. The voltage that is developed at junction 32 is a pulsating voltage, and the frequency of the voltage pulses developed at this junction 32 is a function of generator and engine speed. When the generator is not rotating, it does not generate an output voltage and the voltage at junction 32 is zero.

The signal at junction 32 therefore represents generator and engine speed and also indicates whether or not the generator is rotating but only if there is residual magnetism in the generator or if the voltage regulator 4 has been otherwise activated so that current flows through the field winding 14.

Connected to the charging system 2 is a storage battery 36. The negative side of the storage battery 36 is grounded, and the positive side of the battery 36 is connected to junction 38. The battery 36 will be assumed to be a 12 volt storage battery in the description of this invention, though it is understood that the invention is not limited in this regard. The battery 36 is charged by a circuit that includes the conductor 40 that connects the direct voltage output terminal 24 of the bridge rectifier 20 to the junction 38. The direct voltage output terminal 24 provides a positive voltage output with rippling as a result of the multi-phase AC output currents generated by the generator 10. The battery 36 and generator 10 feed various electrical loads on the motor vehicle, which have not been illustrated but which are electrically connected between junction 38 and ground.

The voltage regulation unit 4 controls the current through field winding 14 to regulate the voltage appearing between junction 38 and ground to a desired regulated value. In describing this invention it will be assumed that the system is a 12 volt system and that the desired regulated voltage that is to be maintained between junction 38 and ground is about 14 volts. This desired regulated voltage typically will vary with temperature. Though the foregoing exemplary voltages (i.e., 12 and 14 volts) are used in most of the preferred implementations, it is understood that the invention may be practiced using different voltages.

The current through field winding 14 is controlled by a semiconductor switching device which takes the form of a metal oxide semiconductor field effect transistor 42. This transistor is an N-channel enhancement mode type of transistor. The transistor 42 has a gate G connected to conductor 44, a drain D connected to junction 46 and a source S connected to one side of field winding 14. The opposite side of field winding 14 is connected to ground. The junction 46 is connected to the positive direct voltage output terminal 24 of the bridge rectifier 20 via conductor 48. A field discharge diode 49 is connected across field winding 14.

When the transistor 42 is biased conductive, between its drain D and source S, the field winding 14 will be energized via a circuit that can be traced from the positive direct voltage output terminal 24, through conductor 48 to junction 46, through the drain D and source S electrodes of transistor 42 and then through the field winding 14 to ground. The transistor 42 is switched on and off, in a manner known in the art, in order to maintain the voltage at junction 38 at the desired regulated value which has been assumed to be about 14 volts. The field winding 14 also can be energized from battery 36 via conductors 40 and 48 and transistor 42.

Biasing of the transistor 42 is controlled by the voltage regulation unit 4, the voltage regulation unit 4 can be programmed or otherwise suitably configured to selectively control biasing of the transistor 42 in a manner dependent upon the rotational speed of the engine 16 and/or generator 10 (i.e. the rotational speed of the field winding 14). An example of this type of control is disclosed in the Bowman et al. patent. Such voltage regulation units 4 can be used, as indicated above, to minimize the increased torque load that is applied to the engine 16 by the generator 10 when a large electrical load is applied to the generator 10 at the time that the engine 16 and generator 10 are operating at a low speed, such as engine idle speed.

In addition, and in accordance with an exemplary embodiment, the voltage regulation unit is programmed to also control the biasing of transistor 42 in response to the comparator output of a pair of signals (P1 and P2).

Figures 2, 3, 4:
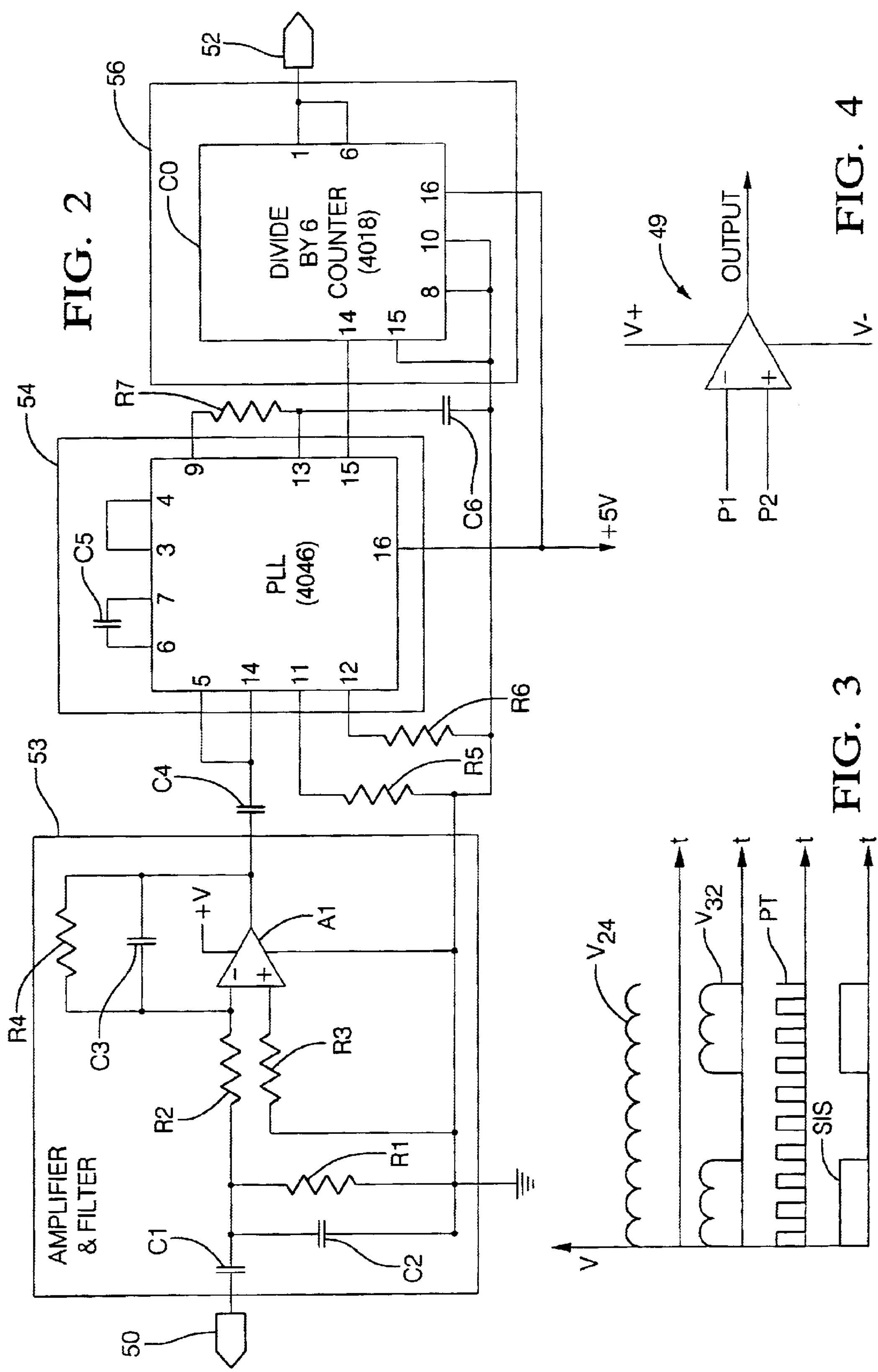
FIG. 2 is a schematic illustration of a preferred implementation of a portion of the speed signal circuitry shown in FIG. 1.
FIG. 3 is a timing diagram that shows different signals that appear in a portion of the speed signal circuitry of FIG. 1, as well as a phase signal developed at an AC input terminal of a bridge rectifier.
FIG. 4 is schematic illustration of a comparator.

The voltage regulation unit 4 thus is adapted to receive a pair of speed-indicative signals P1 and P2. Signal P1 is indicative of the voltage at junction 32 and signal P2 is indicative of speed signal generated by apparatus 6. Signals P1 and P2 are inputted into voltage regulation unit 4. The voltage regulation unit 4 includes a comparator 49 or equivalent for receiving and comparing signals P1 and P2 (FIG. 4). Comparator receives signals P1 and P2 and determines whether there is any differential between the two. If the generator is operating properly signals P1 and P2 should cause comparator 49 to provide a zero output. See also FIG. 3.

If however, signals P1 and P2 are unequal an error or fault signal will be generated on line 70 causing an indicator light 72 to the activated. In exemplary embodiment, indicator light 72 is positioned in a viewable location within the vehicle. Preferably, such viewable location is on the vehicle dashboard.

One of the causes for signals P1 and P2 to be unequal is the failure to one of the diodes in the rectifier bridge. With a single means for determining the rotational speed of the alternator it is difficult to determine whether one of the diodes is open, as the signal will miss one of the filtering networks and change the frequency.

Thus, and with a smart regulator as contemplated in accordance with an exemplary embodiment of the present invention, the voltage regulation unit will be able to determine whether a diode is open and instruct the system to take the necessary steps in order to prevent further damage. For example, transistor 42 may be biased to reduce the load on the alternator thus reducing heat buildup on the other properly operating diodes. In addition, an indicator light is activated instructing a vehicle operator to bring the vehicle in for service. Alternatively, the system may be shut down.

In addition, and in accordance with an exemplary embodiment of the present invention voltage regulation unit 4 is configured to bias transistor 42 in order to limit any damage capable of being caused by a defective diode.

A typical voltage regulation unit 4 responsive to engine and/or generator speed has a single control input P, often referred to as the "P input" or "Phase input." One application of providing the control input P is to electrically connect the voltage regulation unit to the junction 32 of the bridge rectifier 20.

However, and in accordance with an exemplary embodiment of the present invention voltage regulation unit not only receives an input P1 from connection 7 it also receives an input P2 from signal apparatus 6. The speed signal apparatus 6 is adapted to provide a speed-indicative signal SIS indicative of engine rotational speed and/or indicative of generator rotational speed. The speed signal apparatus 6 comprises an input port 50, speed signal circuitry 51, and an output port 52. The input port 50 can be electrically connected to the positive voltage output from the rectifier 20 at terminal 24. The speed signal circuitry 51 is connected to the input port 50 and is adapted to convert rippling in the positive voltage output at terminal 24 into the speed-indicative signal SIS. The output port 52 is connected to the speed signal circuitry 51 and is adapted to apply the speed-indicative signal SIS to components outside of the circuitry 51.

Preferably, as shown in FIG. 1, the output port 52 is connected to the voltage regulation unit 4 so that the speed-indicative signal SIS is applied to the control input P2 of the voltage regulation unit 4. The speed signal circuitry 51 preferably is adapted to apply the speed-indicative signal SIS with a frequency of about one sixth a frequency of the rippling. The speed signal circuitry 51 also can be adapted to apply the speed-indicative signal SIS as a pulse train with a frequency of about one sixth a frequency of the rippling.

Preferably, the speed signal circuitry 51 includes a band pass filter and amplifier combination 53 that passes a range of frequencies in which a frequency of the rippling substantially remains when the associated engine 16 operates at rotational speeds of interest (e.g., low speeds and/or idle speed) and that also amplifies an AC component of the rippling. An exemplary range of frequencies associated with idle speed (and/or low rotational speeds close to idle), is between about 50 and 330 Hertz for a typical pulley rotation ratio of about 2.8-to-1. This typical pulley rotation ratio provides about 2.8 rotations of the generator's pulley for every rotation of the engine's crankshaft pulley. It is understood, however, that the range of frequencies passed by the band pass filter and amplifier combination 53 can be suitably adjusted for different pulley rotation ratios, and that the present invention understandably is not limited to the exemplary range of frequencies, nor is it limited to the exemplary pulley rotation ratio.

Since the typical speed-responsive voltage regulation unit 4 uses the rotational speed primarily to determine whether or not the engine is operating at low speeds, such as idle speed, such low speeds typically will represent speeds of interest to the voltage regulation unit 4. The range of frequencies passed by the band pass filter and amplifier combination 53 therefore preferably includes typical frequencies exhibited by the rippling when the engine 16 is idling or otherwise operating at a rotational speed to be treated substantially the same as idling by the voltage regulation unit 4. Since it may be desirable to provide the voltage regulation unit 4 with the speed-indicative signal even when the generator 10 is rotating faster than such low speeds (e.g., so that the voltage regulation unit 4 can verify that the rotational speed, in fact, is higher than the speed of interest, or for other speed-responsive operations of the voltage regulation unit 4), the band pass filter and amplifier combination 53 can be adapted to pass frequency ranges other than those associated with idle speed or low speed operation of the engine 16.

Another exemplary range of frequencies that can be passed is from about 80 Hertz to about 1.5 kilo Hertz. This range corresponds to generator rotational speeds of about 800 generator r.p.m. to about 15,000 generator r.p.m. With this exemplary range, the voltage regulation unit 4 is able to verify, based on the speed-indicative signal, whether the rotational speed of the generator 10 is higher than what is deemed by the voltage regulation unit 4 to be low speed or idle operation. The voltage regulation unit 4 thus is able to confirm that the generator 10 is rotating at rotational speeds higher than a threshold speed of, for example, 3,000 r.p.m.

In typical applications of the voltage regulation unit 4, it matters only that the voltage regulation unit 4 verify that the rotational speed is higher than the threshold speed, and it does not matter how much higher. In other applications, however, it may be desirable to provide the voltage regulation unit 4 with signals indicative of speed at higher ranges. The present invention therefore is not limited to the exemplary band pass ranges described above, but rather can be practiced using other ranges.

Preferably, the speed signal circuitry 51 includes a phase locked loop 54. The phase locked loop 54 serves to minimize effects of noise on the speed-indicative signal SIS, by locking onto the phase of the signal of interest (i.e., the ripple). The phase locked loop 54 can be implemented using known combinations of circuit elements.

Because it is often desirable to apply the speed-indicative signal SIS with a frequency of about one sixth a frequency of the rippling, or as a pulse train with a frequency of about one sixth the frequency of the rippling, the circuitry 51 preferably includes a frequency divider 56 (e.g., a divide-by-six counter).

With reference to FIG. 2, a preferred implementation of the circuitry 51 of the speed signal apparatus 6 will be described. The following chart describes the components of the preferred circuitry 51 by reference number. The exemplary chip numbers correspond to National Semiconductor chip numbers that are known in the art. Inside the boxes that represent the integrated chips in FIG. 2 are the pin numbers, as assigned by National Semiconductor.

| REFERENCE NUMBER | DESCRIPTION OF COMPONENT |
|---|---|
| C1 | 1 micro farad capacitor |
| C2 | 0.001 micro farad capacitor |
| C3 | 0.01 micro farad capacitor |
| C4 | 0.47 micro farad capacitor |
| C5 | 0.001 micro farad capacitor |
| C6 | 0.001 micro farad capacitor |
| R1 | 1 kilo ohm resistor |
| R2 | 1 kilo ohm resistor |
| R3 | 1 kilo ohm resistor |
| R4 | 100 kilo ohm resistor |
| R5 | 33 kilo ohm resistor |
| R6 | 33 kilo ohm resistor |
| R7 | 33 kilo ohm resistor |
| PLL | phase locked loop integrated chip (e.g., a 4046 chip) |
| CO | divide-by-six counter (e.g., a 4018 integrated chip) |
| A1 | Operational amplifier (op-amp) |

The exemplary speed signal circuitry 51 operates in response to the rippling on the positive voltage output from the rectifier 20 at terminal 24. In particular, the operational amplifier A1 amplifies an AC component of the rippling, the band pass filter part of the combination 53 passes the range of frequencies in which a frequency of the rippling substantially remains during operation of the engine at rotational speeds of interest, and the frequency divider 56 (via counter CO) divides frequencies passed by the band pass filter part of the combination 53 by a factor of about six to provide a frequency divided signal. The phase locked loop 54 is connected to the frequency divider 56 and minimizes effects of electrical noise on the frequency divided signal. The phase locked loop 56 is arranged so that the frequency divided signal is applied as the speed-indicative signal SIS.

Since the voltage regulation unit 4 consumes some energy, it typically is turned-off when the engine 16 is turned off. This prevents the battery 36 from being drained by the voltage regulation unit 4, especially if the engine 16 remains off for a long period of time. As long as the engine 16 remains off, the voltage regulation unit 4 remains off. When the engine 16 is to be restarted, there is consequently a need to activate the voltage regulation unit 4.

Prior art arrangements use a connection from one or more of the stator windings 12 to activate the voltage regulation unit 4 using residual magnetism in the stator windings 12 or use a connection from the ignition switch of the vehicle to activate the voltage regulation unit 4. Those arrangements, however, suffer from certain disadvantages. The residual magnetism-based arrangements, for example, may not activate the voltage regulation unit 4 if the residual magnetism has dissipated over time (e.g., through diode leakage in the bridge rectifier 20), or if the generator 10 has been disassembled and then reassembled without "flashing" the voltage regulation unit 4. The arrangements having a connection from the ignition switch require that extraneous connection to be made, thereby requiring additional wiring to the regulator and/or generator that otherwise might not be required.

Those disadvantages can be avoided by providing an motion-based activation apparatus (not shown) that activates the voltage regulation unit 4 automatically when it detects vibration, motion, and/or acceleration indicative of rotation of the generator and/or engine. An exemplary activation apparatus 6 is disclosed in commonly owned and assigned U.S. patent application entitled Apparatus and Method for Motion-Based Activation of a Voltage Regulator, 6,225,790, the contents of which are incorporated herein by reference thereto, the apparatus requires no external electrical connections that are not already present at the voltage regulation unit 4. It also does not require external electrical connections that are not already present at the generator 10. The exemplary activation apparatus therefore can be integrated into the voltage regulation unit 4 and/or generator 10. An integrated unit may be preferred since it makes protection of the electrical connection between the voltage regulation unit 4 and the activation apparatus more economical and minimizes the likelihood of failure of such connections and any repair or warranty costs associated therewith. The activation apparatus alternatively can be implemented as a separate unit from the voltage regulation unit 4 and/or generator 10, if such a design is deemed acceptable or more desirable.

The exemplary speed signal apparatus 6 advantageously requires no external electrical connections that are not already present at the voltage regulation unit 4. It also does not require external electrical connections that are not already present at the generator 10. The exemplary speed signal apparatus 6 therefore can be integrated into the voltage regulation unit 4 and/or generator 10. An integrated unit may be preferred since it makes protection of the electrical connection between the voltage regulation unit 4 and the speed signal apparatus 6 more economical and minimizes the likelihood of failure of such connections and any repair or warranty costs associated therewith. The speed signal apparatus 6 alternatively can be implemented as a separate unit from the voltage regulation unit 4 and/or generator 10, if such a design is deemed acceptable or more desirable.

As the foregoing description demonstrates, the present invention also includes a method for providing a speed-indicative signal SIS indicative of engine rotational speed or indicative of generator rotational speed. The method comprises the steps of detecting rippling in a positive voltage output from a rectifier 20 of a generator 10, and converting the rippling in the positive voltage output into a speed-indicative signal SIS indicative of engine rotational speed or indicative of generator rotational speed.

Preferably, the speed-indicative signal SIS is applied to a control input of a voltage regulation unit 4. In the case of conventional speed-responsive voltage regulators, the speed-indicative signal SIS can be applied to the "P2" or "Phase2" input of the voltage regulation unit 4. Preferably, the step of converting the rippling is performed so that the speed-indicative signal SIS has a frequency of about one sixth a frequency of the rippling, and preferably is applied as a pulse train. The method also can include the step of filtering the rippling to pass a range of frequencies in which a frequency of the rippling substantially remains when the associated engine 16 operates at rotational speeds of interest. In doing so, the DC component of the positive voltage output is filtered out. An exemplary range of band pass frequencies is between about 50 and 3300 Hertz. Another exemplary range is between about 80 Hertz and about 1.5 kilo Hertz.

The range of frequencies preferably includes typical frequencies exhibited by the rippling when the engine 16 is idling or otherwise operating at a rotational speed to be treated substantially the same as idling by a voltage regulation unit 4. The range of frequencies also can include higher frequencies when the rotational speeds associated therewith are of interest (e.g., when they are of interest to a voltage regulation unit 4).

The method also can include the step of minimizing effects of noise on the speed-indicative signal SIS, using a phase locked loop 54. Preferably, the method further includes the step of amplifying an AC component of the rippling.

As shown in FIG. 3, the input port 50 of the speed signal apparatus 6 preferably receives a substantially DC signal $V_{24}$ at about 14 volts with rippling as a result of the current outputs from the rectifier 20. The illustrated rippling is typical when the load on the terminal 24 is greater than 10 amperes. When this rippled signal is applied to the input port 50, the amplifier and band pass filter combination 53 pass and amplify the AC component of the rippling, and apply the result to the phase locked loop 54. The output of the phase locked loop is a pulse train PT having substantially the same frequency as the rippling. This pulse train PT is applied to the divide-by-six counter CO to provide a frequency divided version of the pulse train PT. This frequency divided version of the pulse train PT then is applied to the output port 52 as the speed-indicative signal SIS. For purposes of comparison, FIG. 3 also shows the voltage $V_{32}$ that appears at junction 32.

It is clear from FIG. 3 that the speed-indicative signal SIS can be inputted into a comparator for comparison to $V_{32}$.

Since, as indicated above, the speed signal apparatus 6 can be integrated into a voltage regulator 60, the present invention also provides a voltage regulator 60 that is responsive to the rotational speed of the engine 16 and/or generator 10. The voltage regulator 60 includes the voltage regulation unit 4 shown in FIG. 1 and the exemplary speed signal apparatus 6. The voltage regulation unit 4 is adapted to control a field current of the generator 10 and has a pair of control inputs (e.g., a "P1 input, P2 input" or "phase inputs") adapted to receive the speed-indicative signal SIS and the input signal from node 32.

The speed signal apparatus 6, as indicated above, is adapted to provide the speed-indicative signal based on the rippling in the positive voltage output of the rectifier 20.

Since the voltage regulator 60 defined by voltage regulation unit 4 and speed signal apparatus 6 can be incorporated conveniently into an existing generator 10, without requiring any electrical connection that is not already required by the generator 10 itself, the voltage regulator 60 advantageously can have its internal components and internal electrical connections protected from exposure or damage. This, in turn, provides a more reliable overall charging system/voltage regulating arrangement.

A reliable and versatile charging system 2 thus can be provided by installing the speed signal apparatus 6 in association with the voltage regulation unit 4 or by incorporating it into an integrated voltage regulator 60 of the charging system. The charging system 2 includes the generator 10, the rectifier 20, the speed signal apparatus 6, and the voltage regulation unit 4 or regulator 60.

Based on the speed-indicative signal SIS, the voltage regulator 60 (or voltage regulation unit 4) of the charging system 2 is able to control electrical current through the field winding 14 of the generator 10 in a manner at least partially dependent upon engine rotational speed or generator rotational speed. In addition, the voltage regulator 60 (or voltage regulation unit 4) is also capable of monitoring failure of component parts of the generator.

While the invention has been described with reference to an exemplary embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. An apparatus for comparing a pair of speed-indicative signals indicative of engine rotational speed or indicative of generator rotational speed, comprising:

an input port for electrical connection to a positive voltage output from a rectifier of a generator;

speed signal circuitry connected to the input port and configured to convert rippling in said positive voltage output into a speed-indicative signal indicative of engine rotational speed or indicative of generator rotational speed;

an output port connected to said circuitry for applying said speed-indicative signal to a comparator; and a means for providing a voltage signal indicative of a voltage across a rectifier bridge of an alternator, said voltage signal being received by said comparator, wherein said comparator is configured to indicated whether a diode of said rectifier bridge is open or inoperative by comparing said speed-indicative signal and said voltage signal.

2. The apparatus as in claim 1, wherein said comparator provides a comparator output indicating any differential between said voltage signal and said speed-indicative signal.

3. The apparatus as in claim 2, wherein said comparator output is inputted into a voltage regulation unit, said voltage regulation unit modifying the output of said alternator in response to the value of said comparator output.

4. The apparatus as in claim 3, wherein an indicator light is activated when said comparator output indicates a differential between said voltage signal and said speed-indicative signal.

5. The apparatus as in claim 2, wherein said speed signal circuitry is configured to apply said speed-indicative signal with a frequency of about one sixth a frequency of the rippling.

6. The apparatus as in claim 2, wherein said speed signal circuitry is configured to apply said speed-indicative signal as a pulse train with a frequency of about one sixth a frequency of the rippling.

7. The apparatus as in claim 2, wherein said speed signal circuitry includes a band pass filter that passes a range of frequencies in which a frequency of said rippling substantially remains when the engine operates at rotational speeds of interest.

8. The apparatus as in claim 7, wherein said range of frequencies is between about 80 and about 1,500 Hertz.

9. The apparatus as in claim 7, wherein said range of frequencies includes typical frequencies exhibited by the rippling when the engine is idling or otherwise operating at a rotational speed to be treated substantially the same as idling by a voltage regulator.

10. The apparatus as in claim 2, wherein said speed signal circuitry includes a phase locked loop.

11. The apparatus as in claim 2, wherein said speed signal circuitry includes an amplifier to amplify an AC component of said rippling.

12. The apparatus as in claim 2, wherein said speed signal circuitry includes:

an amplifier to amplify an AC component of said rippling;

a band pass filter to pass a range of frequencies in which a frequency of said rippling substantially remains during operation of the engine at rotational speeds of interest;

a frequency divider to divide frequencies passed by said band pass filter by a factor of about six to provide a frequency divided signal; and a phase locked loop connected to said frequency divider and to control effects of electrical noise on said frequency divided signal, said phase locked loop being arranged so that said frequency divided signal is applied as said speed-indicative signal.

13. A method for providing a signal indicative of an alternator operation, comprising:

determining a first speed-indicative signal indicative of engine rotational speed or indicative of generator rotational speed by detecting rippling in a positive voltage output from a rectifier of a generator, converting said rippling in said positive voltage output into a speed-indicative signal indicative of engine rotational speed or indicative of generator rotational speed;

comparing said first speed-indicative signal to a voltage signal across said rectifier; and providing a comparative output signal corresponding to the difference between said first speed-indicative signal and said voltage signal, wherein said comparator output signal indicates whether a diode of said rectifier bridge is open or inoperative.

14. The method as in claim 13, further comprising the step of applying said speed-indicative signal and said voltage signal to control inputs of a voltage regulator.

15. The method as in claim 14, wherein said voltage regulator modifies the operation of said alternator in response to said comparator output signal.

16. The method as in claim 14, wherein said voltage regulator includes a means for providing said comparator output.

17. The method as in claim 14, wherein said comparator output signal is used to provide a signal to an indicator light, said indicator light indicating that the operation of said alternator is outside a preferred operational range.

18. The method as in claim 13, wherein said step of converting said rippling is performed so that the speed-indicative signal has a frequency of about one sixth a frequency of the rippling.

19. The method as in claim 13, wherein said step of converting said rippling is performed so that said speed-indicative signal is a pulse train with a frequency of about one sixth a frequency of the rippling.

20. The method as in claim 13, further comprising the step of filtering said rippling to pass a range of frequencies in which a frequency of said rippling substantially remains when an associated engine operates at rotational speeds of interest.

21. The method as in claim 20, wherein said range of frequencies is between about 80 and about 1,500 Hertz.

22. The method as in claim 20, wherein said range of frequencies includes typical frequencies exhibited by the rippling when the engine is idling or otherwise operating at a rotational speed to be treated substantially the same as idling by a voltage regulator.

23. The method as in claim 13, further comprising the step of minimizing effects of noise on said speed-indicative signal, using a phase locked loop.

24. The method as in claim 13, wherein said step of converting the rippling includes the step of amplifying an AC component of said rippling.

25. The method as in claim 13, wherein said step of converting the ripping includes the steps of:

amplifying an AC component of said rippling;

filtering said rippling to pass a range of frequencies in which a frequency of said rippling substantially remains during operation of an associated engine at rotational speeds of interest;

frequency dividing frequencies passed by said filtering by a factor of about six to provide a frequency divided signal; and controlling effects of electrical noise on said frequency divided signal using a phase locked loop.

26. A generator for use with an engine and an electric storage medium, the generator comprising:

a voltage regulation unit for controlling a current through a field winding of the generator;

a speed signal apparatus for generating a speed signal of the generator or the engine;

a rectifier bridge having a plurality of positive and negative diode; and a comparator for receiving and comparing said speed signal and a voltage generated between said plurality of positive and negative diodes, wherein said comparator provides a signal indicating whether one of said plurality of positive and negative diodes is open or inoperative.

27. The generator as in claim 26, wherein said speed signal apparatus comprises:

an input port for electrical connection to a positive voltage output from said rectifier;

speed signal circuitry connected to the input port and configured to convert rippling in said positive voltage output into said speed signal; and an output port connected to said speed signal circuitry and said comparator.

28. The generator as in claim 27, wherein said speed signal circuitry performs the method of:

amplifying and AC component of said rippling;

filtering said rippling to pass a range of frequencies in which a frequency of said rippling substantially remains during operation of rotational speed of interest of the engine;

frequency dividing frequencies passed by a band pass filter by a factor of about six to provide a frequency divided signal; and controlling effects of electrical noise on said frequency divided signal using a phase locked loop.

* * * * *